(12) United States Patent
Komori et al.

(10) Patent No.: US 7,666,549 B2
(45) Date of Patent: Feb. 23, 2010

(54) ENCLOSED NICKEL-METAL HYDRIDE STORAGE BATTERY

(75) Inventors: Katsunori Komori, Toyohashi (JP); Yoshiaki Ogata, Toyohashi (JP); Atsushi Adachi, Kosai (JP); Katsunori Maegawa, Kosai (JP); Noriyuki Fujioka, Kosai (JP); Haruyoshi Yamashita, Toyota (JP); Yasuhiro Takahashi, Toyota (JP)

(73) Assignees: Panasonic Corporation, Osaka (JP); Toyota Jidosha Kabushiki Kaisha, Aichi (JP)

( * ) Notice: Subject to any disclaimer, the term of this patent is extended or adjusted under 35 U.S.C. 154(b) by 357 days.

(21) Appl. No.: 11/652,316

(22) Filed: Jan. 11, 2007

(65) Prior Publication Data

US 2007/0111092 A1 May 17, 2007

Related U.S. Application Data

(62) Division of application No. 10/607,581, filed on Jun. 26, 2003, now abandoned.

(30) Foreign Application Priority Data

Jun. 26, 2002 (JP) .............................. 2002-186724

(51) Int. Cl.
*H01M 2/02* (2006.01)
(52) U.S. Cl. ..................................... 429/176
(58) Field of Classification Search .............. None
See application file for complete search history.

(56) References Cited

U.S. PATENT DOCUMENTS

| 4,892,793 | A | 1/1990 | Von Benda et al. |
| 5,747,186 | A | 5/1998 | Morishita et al. |
| 5,780,180 | A | 7/1998 | Okamoto et al. |
| 6,528,202 | B1 | 3/2003 | Arai et al. |
| 6,939,642 | B2 | 9/2005 | Asahina et al. |
| 2002/0142178 | A1* | 10/2002 | Yamashita et al. .......... 428/461 |
| 2004/0137320 | A1 | 7/2004 | Komori et al. |
| 2004/0191619 | A1 | 9/2004 | Komori et al. |

FOREIGN PATENT DOCUMENTS

| JP | 5-21045 | 1/1993 |
| JP | 5-283059 | 10/1993 |
| JP | 9-259840 | 10/1997 |
| JP | 10-106513 | 4/1998 |
| JP | 3049854 | 3/2000 |
| JP | 2004-22455 | 1/2001 |
| JP | 2002-329483 | 11/2002 |
| JP | 2004-22454 | 1/2004 |
| WO | WO 0145183 A1 * | 6/2001 |

OTHER PUBLICATIONS

Form PTO-892 for co-pending U.S. Appl. No. 10/798,149, dated Jul. 9, 2007.

* cited by examiner

*Primary Examiner*—Robert Hodge
(74) *Attorney, Agent, or Firm*—Hamre, Schumann, Mueller & Larson, P.C.

(57) ABSTRACT

An alkaline storage battery of the present invention includes a battery case and a group of electrodes. The battery case is provided with a resin case and a coating layer made of a resin formed on at least one surface selected from an inner surface and an outer surface of the resin case. The hydrogen permeability coefficient of the resin that is the material of the coating layer is $1 \times 10^{-15}$ mol·m/m$^2$·sec·Pa or less.

4 Claims, 6 Drawing Sheets

ENCLOSED NICKEL-METAL HYDRIDE STORAGE BATTERY

CROSS-REFERENCE TO RELATED APPLICATIONS

This application is a Division of application Ser. No. 10/607,581, filed Jun. 26, 2003, which application is incorporated herein by reference.

BACKGROUND OF THE INVENTION

1. Field of the Invention

The present invention relates to alkaline storage batteries.

2. Description of the Related Art

An enclosed alkaline battery using a battery case often is used as a power source for large scale power, for example, a power source of electric cars or hybrid cars. In such an enclosed alkaline battery; when an electrolyte or a gas component permeates through the battery case and leaks out, the characteristics deteriorate significantly. In order to prevent this leakage, in general, a battery case made of a metal is used.

However, it is difficult to form the battery case made of a metal into an arbitrary shape, and the battery case made of a metal is heavy. On the other hand, although a battery case made of a resin can be processed easily and is light, vapor or oxygen gas or hydrogen gas can permeate through the battery case easily. In particular, in a nickel-metal hydride battery using a hydrogen-absorbing alloy, when the amount of the hydrogen in the battery case is reduced by the hydrogen permeating through the battery case, the capacity balance between the positive electrode and the negative electrode is broken, which may deteriorate the characteristics significantly.

In order to solve this problem, a method for forming a metal layer on the surface of a battery bath made of a resin is proposed (Japanese Patent No. 3049854). However, this method is not preferable, for example, in view of the possibility of short-circuiting because the metal layer is exposed at the surface of the battery case.

SUMMARY OF THE INVENTION

Therefore, with the foregoing in mind, it is an object of the present invention to provide an alkaline storage battery including a battery case made primarily of a resin and having reduced deterioration of the battery characteristics.

In order to achieve the above object, a first alkaline storage battery of the present invention includes a battery case and a group of electrodes arranged in the battery case and is characterized in that the battery case includes a resin case and a coating layer made of a resin formed on at least one surface selected from an inner surface and an outer surface of the resin case, and the hydrogen permeability coefficient of the resin that is the material of the coating layer is $1\times10^{-15}$ mol·m/m²·sec·Pa or less. In this alkaline storage battery, the coating layer made of a resin having a low hydrogen permeability coefficient is formed so that hydrogen gas or the like is suppressed from permeating through the battery case to the outside, and therefore the deterioration of the characteristics can be suppressed.

The hydrogen permeability coefficient can be measured using a general method. The values of the hydrogen permeability coefficient described in the examples of this specification are obtained as a result of measurement using a method defined in the method A of JIS-K7126 and setting the test temperature to 40° C.

In the first alkaline storage battery, it is preferable that the resin of the coating layer is at least one resin selected from the group consisting of polyvinyl alcohol, ethylene-vinyl alcohol copolymer, polyacrylonitrile and polyvinylidene chloride. These resins are preferable because their hydrogen permeability coefficients are sufficiently low.

In the first alkaline storage battery, it is preferable that the resin case is made of a polymer alloy of polypropylene and polyphenylene ether. According to this embodiment, a resin case having excellent strength, moldability, chemical resistance, and weather resistance can be obtained.

In the first alkaline storage battery, it is preferable that the thickness of the coating layer is in the range from 5 µm to 100 µm.

In the first alkaline storage battery, it is preferable that the hydrogen permeability of the coating layer is $1\times10^{-11}$·mol/m²·sec·Pa or less.

In the first alkaline storage battery, the coating layer may be formed on an outer surface of the resin case. The above alkaline storage battery may include a multilayered film formed on the at least one surface, and the multilayered film may include the coating layer.

In the first alkaline storage battery, it is preferable that the multilayered film is integrated with the resin case by insert molding or two-color molding. According to this embodiment, the adhesion between the multilayered film and the resin case can be enhanced.

In the first alkaline storage battery, it is preferable that the multilayered film includes a surface layer made of a water resistant resin. According to this embodiment, an alkaline storage battery having particularly reduced deterioration of the battery characteristics under high humidity can be obtained.

In the first alkaline storage battery, it is preferable that the multilayered film includes a layer containing the same resin as a resin constituting the resin case on a surface in contact with the resin case. According to this embodiment, the multilayered film can be suppressed from being detached from the resin case.

A second alkaline storage battery of the present invention includes a battery case and a group of electrodes arranged in the battery case and is characterized in that the battery case includes a resin case and a multilayered film formed on at least one surface selected from an inner surface and an outer surface of the resin case, and the multilayered film includes a surface layer made of a resin and a metal layer disposed between the surface layer and the resin case. In this alkaline storage battery, the metal layer formed on the surface of the resin case of the multilayered film can suppress hydrogen gas or the like from permeating through the battery case to the outside, and therefore an alkaline storage battery having reduced deterioration of the battery characteristics can be obtained.

In the second alkaline storage battery, it is preferable that the multilayered film further includes a resin layer disposed between the metal layer and the resin case. It also is preferable that this resin layer contains the same resin as the resin constituting the resin case. According to this embodiment, the metal layer is prevented from being detached from the resin case.

In the second alkaline storage battery, it is preferable that the multilayered film is integrated with the resin case by insert molding.

In the second alkaline storage battery, it is preferable that the resin case is made of a polymer alloy of polypropylene and polyphenylene ether.

In the second alkaline storage battery, it is preferable that the metal layer is made of aluminum. According to this embodiment, a lightweight and relatively inexpensive alkaline storage battery can be obtained.

As described above, the alkaline storage battery of the present invention includes a battery case body formed primarily of a resin and a coating layer with which the battery case body is coated, and the hydrogen permeability coefficient of the coating layer is small. By using the battery case body formed primarily of a resin, an alkaline storage battery having high safety and a small weight and an arbitrary shape can be produced. Furthermore, the coating layer having a small hydrogen permeability coefficient makes it possible to suppress the deterioration of the characteristics. The present invention can be applied to alkaline storage batteries such as a nickel-metal hydride battery or a nickel-cadmium storage battery.

DESCRIPTION OF THE PREFERRED EMBODIMENTS

Hereinafter, embodiments of the present invention will be described with reference to the accompanying drawings.

Embodiment 1

Figure 1A:
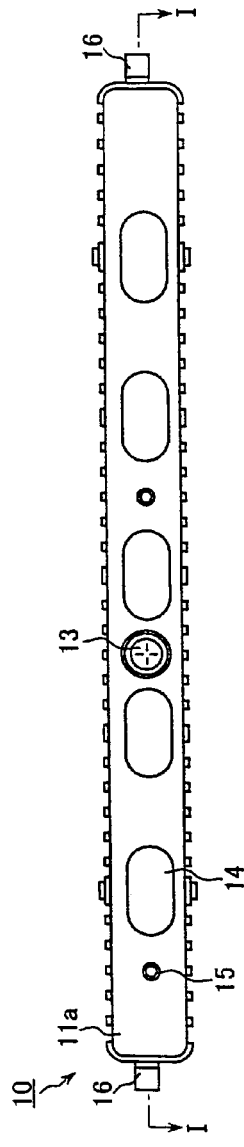
FIG. 1A shows a top face of an alkaline storage battery of the present invention.
Figure 1B:
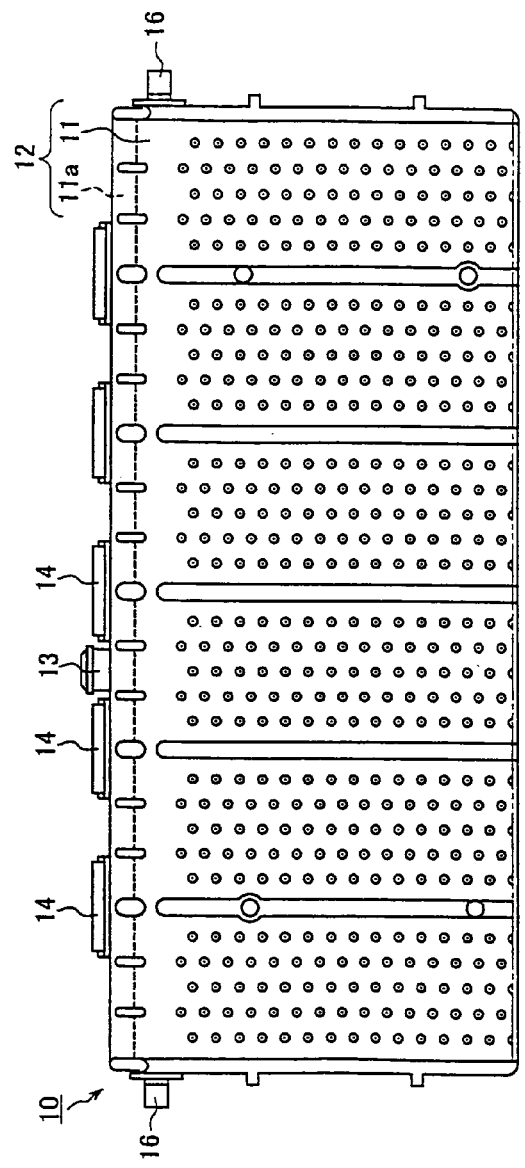
FIG. 1B shows the side face thereof.

In Embodiment 1, an example of an alkaline storage battery of the present invention will be described. FIG. 1A is a top plan view of an alkaline storage battery 10 of Embodiment 1, and FIG. 1B is a side view thereof.

Figure 2:
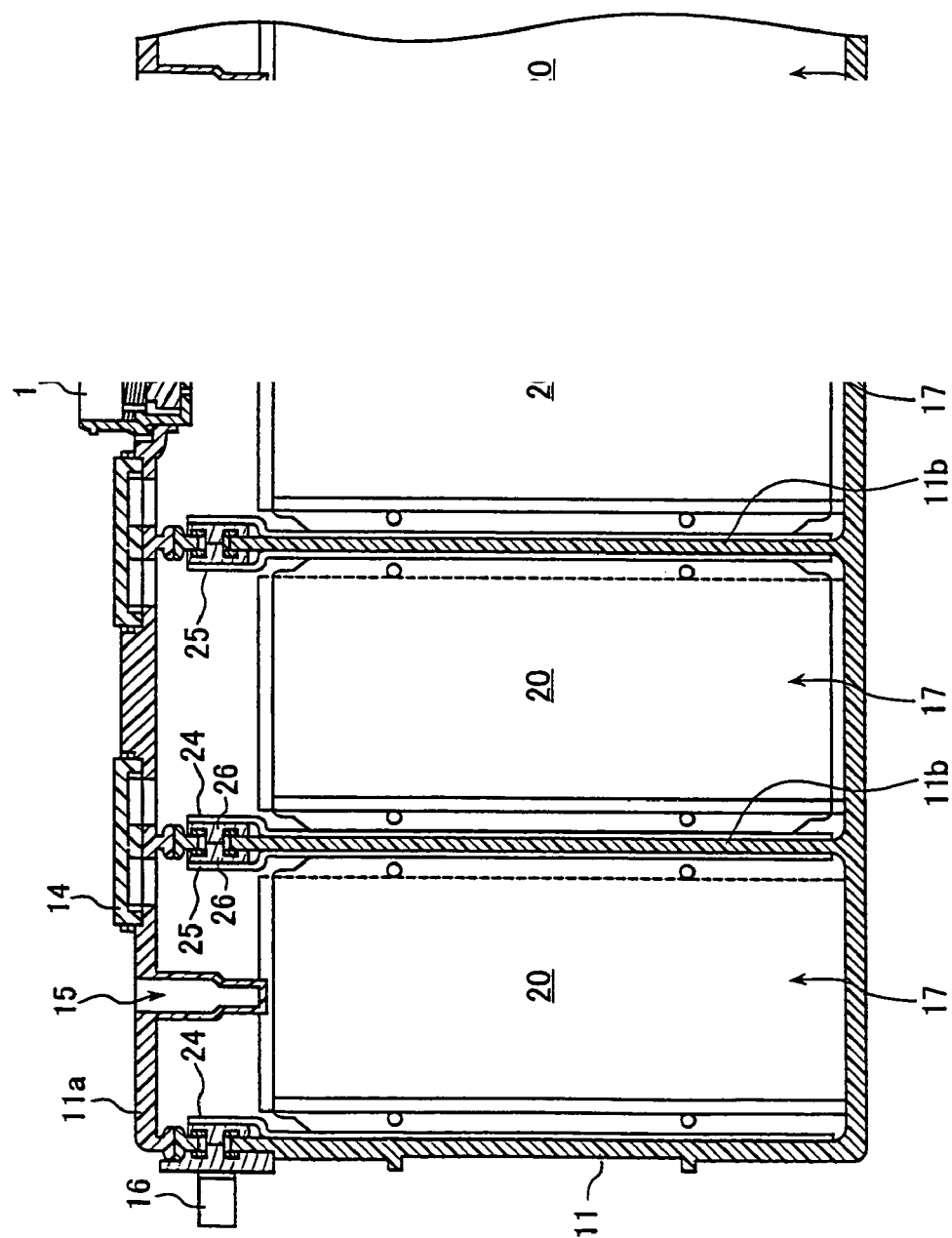
FIG. 2 shows a partial cross-section of the alkaline storage battery shown in FIG. 1.

The alkaline storage battery 10 is provided with a battery case 12 including a battery case body 11 and a lid 11a enclosing the battery case body 11. A safety valve 13, a lid 14 with a communicating hole and a temperature sensor mounting hole 15 are provided in the lid 11a. Two terminals 16 are provided in the battery case body 11. The safety valve 13 is open when the internal pressure in the battery case 12 reaches a predetermined value or more, and the gas inside is released so as to reduce the internal pressure in the battery case 12. A plurality of protrusions are formed on the surface of the battery case body 11 in order to improve the heat release properties when a plurality of alkaline storage batteries 10 are arranged while being attached tightly to each other. FIG. 2 is a partial cross-sectional view taken along line I-I of FIG. 1A.

The internal portion of the battery case body 11 is partitioned into six compartments by partitions 11b. A group of electrodes 20 and an electrolyte (not shown) are disposed in each compartment. The group of electrodes 20 and the electrolyte constitute a cell 17. In other words, the alkaline storage battery 10 is provided with six cells 17. The lid 14 with a communicating hole makes it possible to balance the internal pressure in the cells 17.

Figure 3:
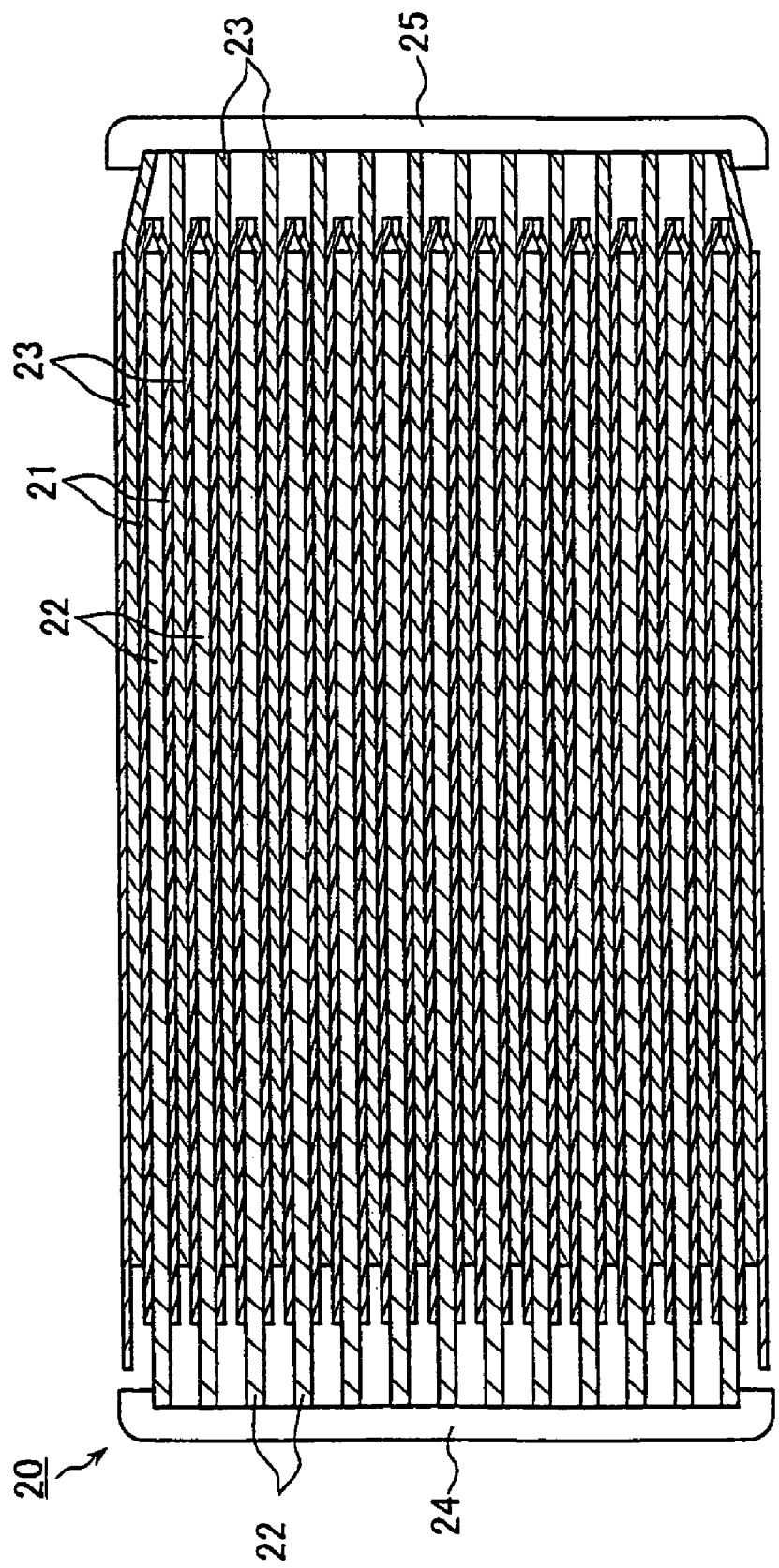
FIG. 3 shows a cross-section of a group of electrodes of the alkaline storage battery shown in FIG. 1.

FIG. 3 is a cross-sectional view of the group of electrodes 20. The group of electrodes 20 includes a separator 21, a positive plate 22 and a negative plate 23 that are laminated alternately with the separator 21 interposed therebetween, a collector 24 connected to the positive plate 22 and a collector 25 connected to the negative plate 23. As shown in FIG. 2, the collectors 24 and 25 are connected to the terminal 16 or a connection terminal 26. The collector 25 of the cell 17 is connected to the collector 24 of the adjacent cell 17 via the connection terminal 26. Thus, the cells 17 are connected in series.

For the separator 21, a commonly used separator can be used, and for example, a polypropylene nonwaven fabric that has been treated so as to be hydrophilic can be used. For the positive plate 22 and the negative plate 23, an electrode plate that is commonly used for an alkaline storage battery can be used. For example, the positive plate 22 can be produced by applying a paste containing nickel hydroxide as an active material to a conductive support member so as to produce a sheet, and then drying, rolling and cutting this sheet. The negative plate 23 can be produced by applying a paste containing a hydrogen-absorbing alloy or cadmium hydroxide to a conductive support member so as to produce a sheet, and then drying, rolling and cutting this sheet.

Figure 4:
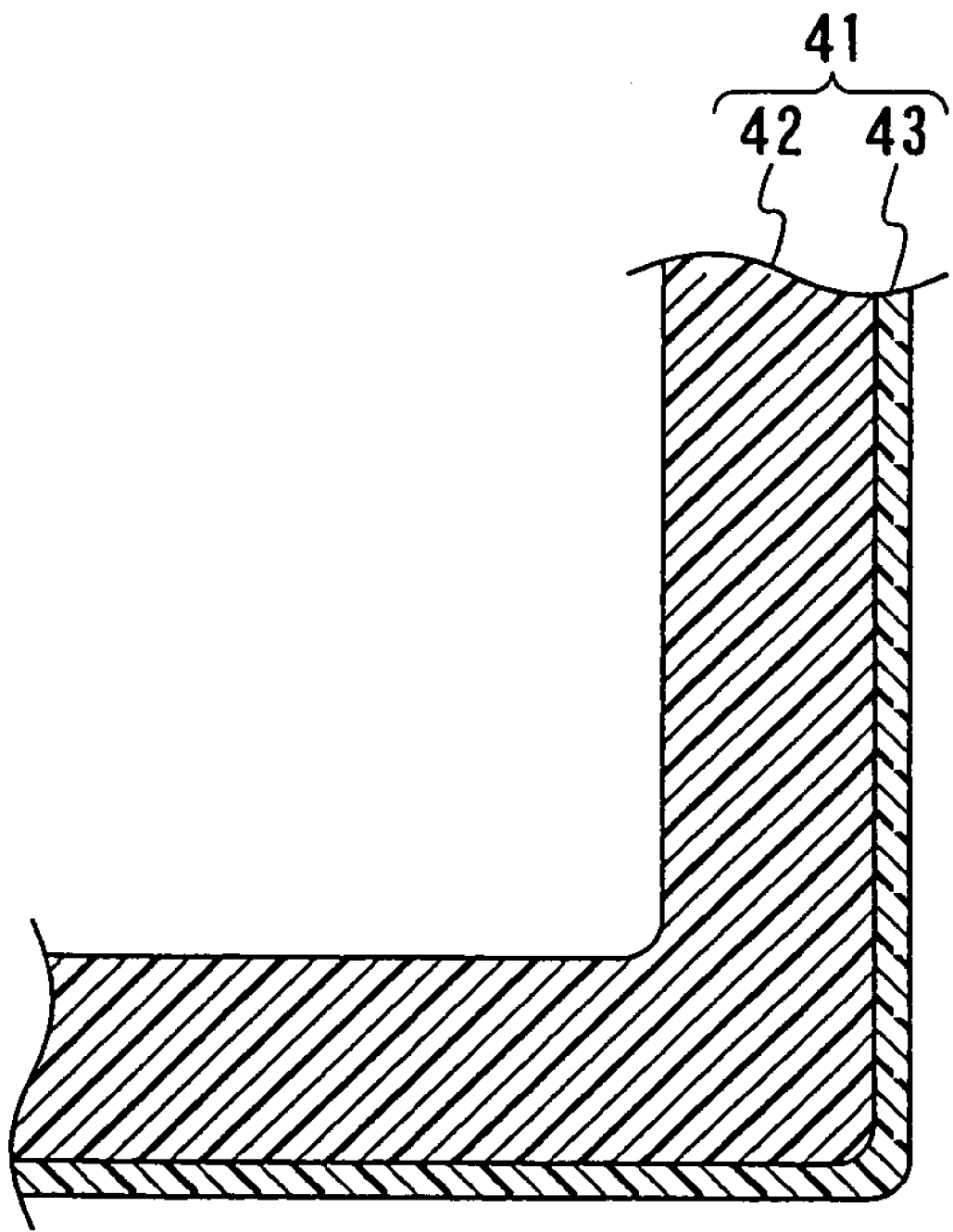
FIG. 4 shows a partial cross-section of an example of the body of a battery case of the alkaline storage battery of the present invention.

Next, the battery case body 11 will be described. The battery case body 11 includes a resin case, and a coating layer made of a resin formed on at least one surface selected from the inner surface and the outer surface of the resin case. FIG. 4 shows a partial cross-section of a battery case body 41 in which a coating layer is formed on the outer surface of a resin case as an example of the battery case body 11.

Referring to FIG. 4, the battery case body 41 includes a resin case 42 and a coating layer 43 that is formed on the outer surface of the resin case 42. The resin case 42 is a case made of a resin or a case made primarily of a resin. The thicker the resin case 42 is, the higher the strength is and the lower the gas permeability is, but in this case, the weight becomes larger. When the resin case 42 is thick, the heat release properties of the battery deteriorate. For this reason, in general, the average thickness of the resin case 42 is about 1 mm to 3 mm. The resin case 42 is formed of a resin, such as polypropylene (PP) alone, or a polymer alloy of polypropylene (PP) and polyphenylene ether (PPE).

The coating layer 43 can be formed of a resin (hereinafter, also referred to as "resin A"). The hydrogen permeability coefficient of the resin A is $1 \times 10^{-15}$ mol·m/m²·sec·Pa or less, and preferably $1 \times 10^{-17}$ mol·m/m²·sec·Pa or less. For the resin A, at least one resin selected from the group consisting of polyvinyl alcohol (PVA), ethylene-vinyl alcohol copolymer (EvOH), polyacrylonitrile (PAN) and polyvinylidene chloride (PVDC) can be used. The thickness of the coating layer 43 is in the range from 5 μm to 100 μm, and preferably in the range from 10 μm to 50 μm. The coating layer 43 may be coated with an additional coating layer. The hydrogen permeability of the coating layer 43 is expressed by an equation (hydrogen permeability)=(hydrogen permeability coefficient)/(thickness). It is preferable that the hydrogen permeability of the coating layer 43 is $2 \times 10^{-10}$ mol/m²·sec·Pa or less, more preferably $1 \times 10^{-11}$ mol/m²·sec·Pa or less.

Figure 5:
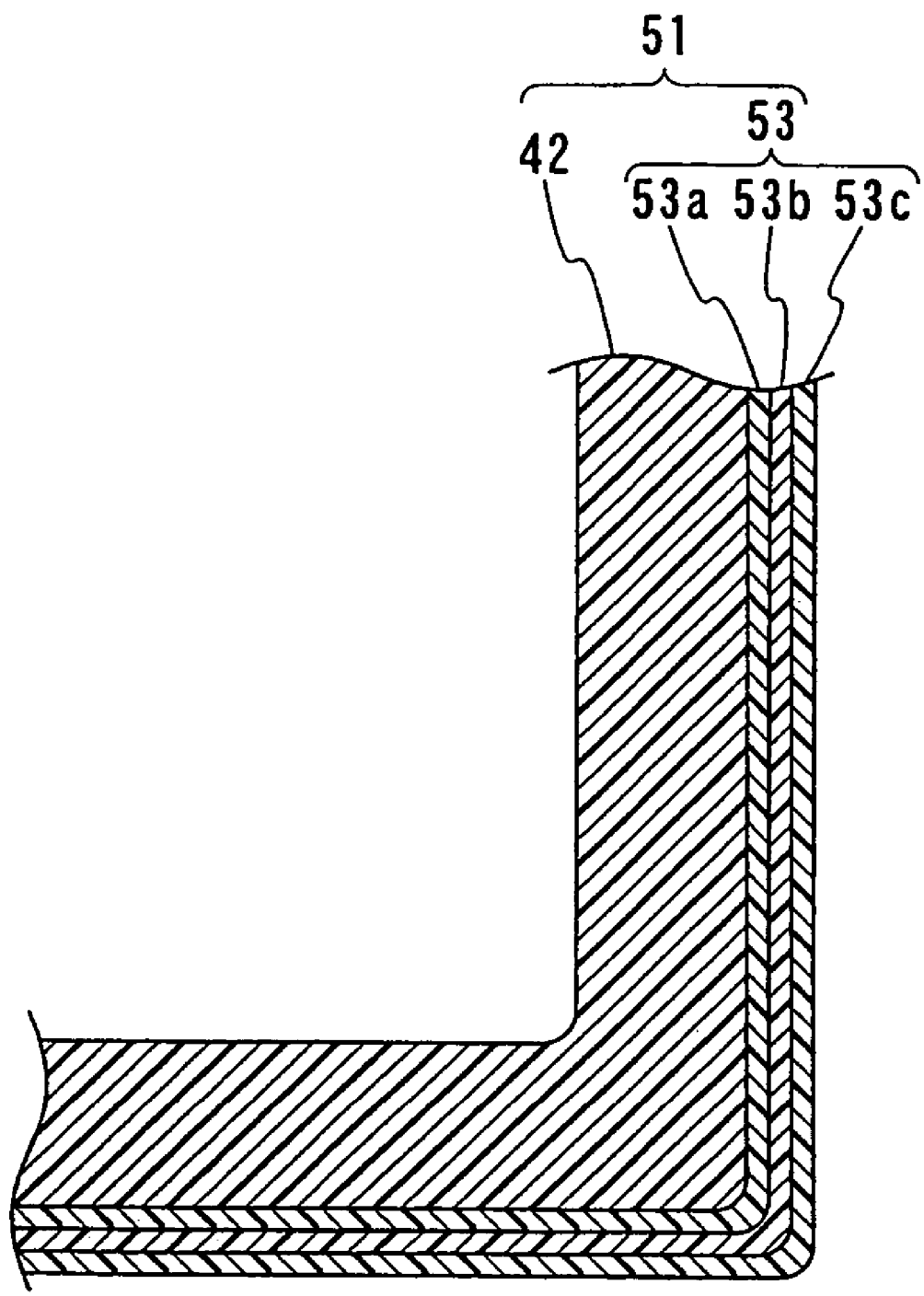
FIG. 5 shows a partial cross-section of another example of the body of a battery case of the alkaline storage battery of the present invention.

Next, a battery case body 51 in which a multilayered film including a coating layer is formed on the outer surface of a resin case will be described as another example of the battery case body 11 with reference to FIG. 5. In this case, the battery case body 51 includes a resin case 42 and a multilayered film 53 formed on the outer surface of the resin case 42. The resin case 42 is the same as the resin case 42 described above. The multilayered film 53 includes a first layer 53a, a second layer 53b and a third layer 53c that are arranged in this order from the resin case 42 side. It is preferable to use a material having a high adhesion to the resin case 42 as the material of the first layer 53a, and the material preferably contains a resin constituting the resin case 42. There is no limitation regarding the thickness of the first layer 53a, but it is for example, about 20 μm to 70 μm. The second layer 53b is made of the same material (resin A) as the above-described coating layer 43, and has the same thickness. The third layer 53c has weather resistance and chemical resistance and is formed in order to protect the second layer 53b. The third layer 53c, which is the surface layer, preferably is formed of a moisture resistant resin, and for example, can be formed of polypropylene (PP). There is no limitation regarding the thickness of the third layer 53c, but it is for example, about 20 μm to 70 μm. It is sufficient that the multilayered film 53 contains the second layer 53b having a small hydrogen permeability coefficient and there is no limitation regarding the number of layers.

Next, the lid 11a will be described. The lid 11a can be formed of the same material as the resin case 42. There is no limitation regarding the thickness of the lid 11a, but in general, the average thickness is about 2 mm to 4 mm. It is preferable that the coating layer 43 or the multilayered film 53 also is formed in the lid 11a. However, since the lid 11a generally is thicker than the resin case 42, hydrogen or the like permeates through the lid only to a small extent, even if the coating layer is not formed.

In the alkaline storage battery of the present invention, it is preferable that a coating layer having a low hydrogen permeability coefficient is formed on the entire surface of the battery case body. However, even if the coating layer is not formed on the entire surface, a sufficient effect can be obtained if the coating layer is formed on a portion in which the thickness of the resin case is small and through which hydrogen permeates easily.

Hereinafter, a method for producing the alkaline storage battery of the present invention will be described. The alkaline storage battery of the present invention can be produced in the same manner as when producing a commonly used alkaline storage battery except for how to produce the battery case body. Therefore, a method for producing the battery case body will be described.

First, a method for producing the battery case body 41 will be described. The resin case 42 can be produced by a commonly used method, such as injection molding. The coating layer 43 can be formed by applying a resin solution that is the material of the coating layer 43 to the outer surface of the resin case 42 and drying the resin solution. The application and the drying can be repeated.

Next, a method for producing the battery case body 51 in which the coating layer is formed on the inner surface of the battery case body will be described. The battery case body 51 can be formed by insert molding or two-color molding. More specifically, the multilayered film 53 is disposed inside the mold, and then a resin that is the material of the resin case 42 is injected for molding, so that the battery case body 51 in which the multilayered film 53 is integrated with the inner surface of the resin case 42 can be produced.

As described above, in the alkaline storage battery of Embodiment 1, the battery case body including the resin case and the coating layer having a small hydrogen permeability coefficient that is formed on the surface of the resin case are used. In this case, the hydrogen permeability of the battery case body provided with one coating layer is expressed by Equation 1 below.

$$1/(\text{the hydrogen permeability of the battery case body}) = 1/(\text{the hydrogen permeability of the resin case}) + 1/(\text{the hydrogen permeability of the coating layer})$$ Equation 1

Therefore, the hydrogen permeability of the battery case body can be reduced significantly by forming the coating layer having a low hydrogen permeability. In Embodiment 1, the hydrogen permeability has been described, but gas other than hydrogen such as oxygen or an electrolyte hardly permeates the coating layer having a low hydrogen permeability, so that this embodiment can provide an effect of preventing permeation of these substances.

Embodiment 2

In Embodiment 2, another example of an alkaline storage battery of the present invention will be described. The alkaline storage battery of Embodiment 2 is different only in the coating layer formed on the battery case body from the alkaline storage battery described in Embodiment 1, so that duplicate description will be omitted.

The battery case body of Embodiment 2 includes the resin case 42 described in Embodiment 1, and the multilayered film formed on at least one surface selected from the inner surface and the outer surface of the resin case 42. The multilayered film includes a surface layer made of a resin and a metal layer disposed between the surface layer and the resin case 42. In other words, the multilayered film that coats the resin case 42 includes a metal layer, and the surface layer made of a resin prevents the metal layer from being exposed to the surface.

Figure 6:
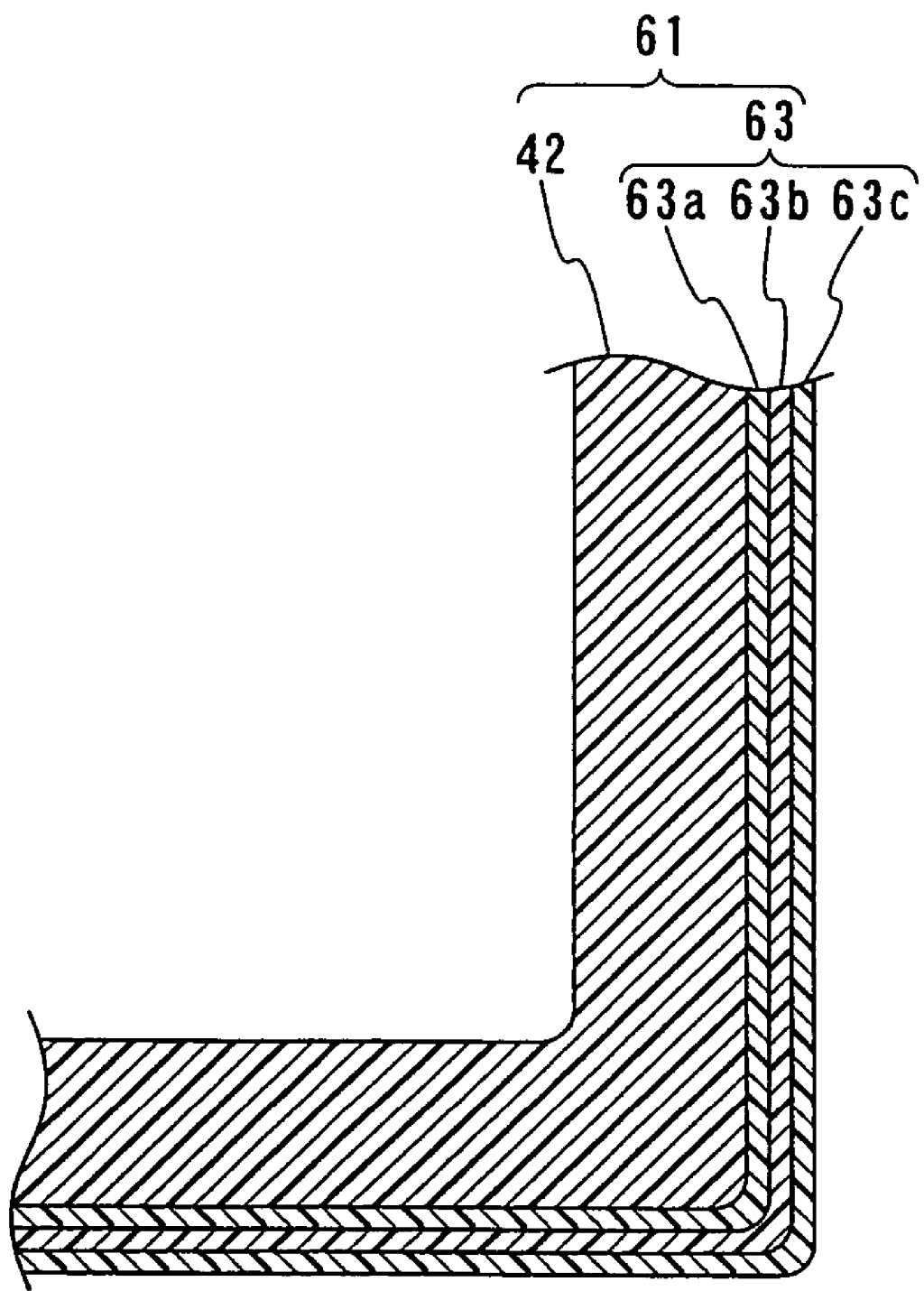
FIG. 6 shows a partial cross-section of yet another example of the body of a battery case of the alkaline storage battery of the present invention.

FIG. 6 shows an enlarged view of a part of a battery case body 61 in which a multilayered film 63 is formed on the outer surface of the resin case 42 as an example of the battery case body of Embodiment 2. The multilayered film 63 includes a surface layer 63c made of a resin, a metal layer 63b disposed between the surface layer 63c and the resin case 42, and a layer 63a disposed between the metal layer 63b and the resin case 42. The surface layer 63c is a layer that prevents the metal layer 63b to be exposed, and for example, can be formed of a nylon resin or a polyolefin resin. It is preferable that the surface layer 63c is made of a moisture resistant resin. The metal layer 63b can be formed of, for example, aluminum or iron. The layer 63a is a layer for enhancing the adhesion between the multilayered film 63 and the resin case 42, and it preferably contains the same resin as the resin constituting the resin case 42. For example, when the resin case 42 contains polypropylene, the layer 63a can be formed of polypropylene. The thickness of the metal layer 63b is, for example, in the range from 5 μm to 100 μm, preferably in the range from 20 μm to 50 μm. The thickness of the surface layer 63c is, for example, about 20 μm to 70 μm. The thickness of the layer 63a is, for example, about 20 μm to 70 μm.

The battery case body 61 can be produced by insert molding or two-color molding in the same manner as when producing the battery case body 51 of Embodiment 1. In this case, the multilayered film 63 is integrated with the resin case 42 by insert molding or two-color molding. There is no limitation regarding the number of layers constituting the multilayered film, as long as the object of the present invention can be achieved. In FIG. 6, the multilayered film 63 is formed on the outer surface of the resin case, but the multilayered film 63 can be formed on the inner surface of the resin case. Also in this case, the multilayered film 63 can be formed by insert molding or two-color molding.

EXAMPLES

Hereinafter, the present invention will be described more specifically by way of example.

Example 1

In Example 1, a nickel-metal hydride battery was produced as an example of the alkaline storage battery of Embodiment 1. For the nickel-metal hydride battery of Example 1, the battery case body having the same structure as that of the battery case body 41 shown in FIG. 4 was used.

For the separator 21, a sulfonated polypropylene nonwaven fabric was used. A positive plate containing nickel hydroxide was used for the positive plate 22 and a negative plate containing a hydrogen-absorbing alloy was used for the negative plate 23. For an electrolyte, an alkaline aqueous solution having a specific gravity of about 1.3 that contains potassium hydroxide as the main solute was used.

The resin case 42 of the battery case body was formed of a polymer alloy of polypropylene (PP) and polyphenylene ether (PPE) by injection molding. The hydrogen permeability coefficient of this polymer alloy was $4 \times 10^{-15}$ mol·m/m²·sec·Pa. The average thickness of the resin case was 1.5 mm.

The coating layer made of ethylene-vinyl alcohol copolymer (EvOH), polyvinylidene chloride (PVDC), or polyvinyl alcohol was formed. More specifically, a solution in which these resins were dissolved in a solvent based on water or alcohol was applied onto the outer surface of the resin case and then dried, which process was repeated, so that the coating layer was formed. In order to enhance the adhesion between the resin case and the coating layer for all the samples, the surface of the resin case was subjected to an anchor coating treatment before the resin solution was applied in order to activate the surface.

With the above members, three types of nickel-metal hydride batteries (capacity: 6.5 Ah) were produced. As a comparative sample A, a nickel-metal hydride battery that was different only in that no coating layer was formed was produced. Then, these four batteries were charged such that the state of charge (SOC) reached 80% and then were stored in an atmosphere at 65° C. for one month. Next, the amount of the discharge reserve of the negative electrode was measured with respect to the batteries that had been stored. Herein, "discharge reserve" refers to a negative plate capacity that is charged greater than a positive plate capacity. It seems that when hydrogen is released from the inside of the battery case to the outside, the partial pressure of hydrogen inside the battery case is reduced, so that hydrogen is released from the hydrogen-absorbing alloy and therefore the discharge reserve is reduced. When the negative plate capacity is reduced and becomes equal to the positive plate capacity or less (i.e., the discharge reserve is 0), the characteristics of the battery are deteriorated significantly.

The discharge reserve was measured in the following manner. First, the battery was discharged until the voltage of the battery reached 1.0 V. Then, a hole was drilled on the upper portion of the battery and an electrolyte was refilled. Then, a Hg/HgO reference electrode was immersed in the electrolyte in the battery case. Then, the battery was overdischarged while the discharge capacity was measured. The discharge reserve was defined by an equation (the discharge reserve)= (the discharge capacity up to the point when the potential difference obtained by subtracting the potential of the reference electrode from the potential of the negative electrode reaches −0.7 V)−(the discharge capacity up to the point when the voltage of the cell reaches 0 V). Table 1 shows the thickness of the coating layer of each sample, the measurement results of the discharge capacity, and the hydrogen permeability coefficient of the resin constituting each coating layer.

TABLE 1

| Sample No. | material of coating layer | thickness of coating layer [μm] | discharge reserve [Ah] | hydrogen permeability coefficient [mol · m/m² · sec · Pa] |
|---|---|---|---|---|
| Comparative Sample A | No coating layer | — | 2.0 | — |
| Sample 1 | EvOH | 7 | 2.4 | $8 \times 10^{-18}$ |
| Sample 2 | PVDC | 5 | 2.2 | $1 \times 10^{-17}$ |
| Sample 3 | PVA | 10 | 2.6 | $6 \times 10^{-18}$ |

As shown in Table 1, the sample provided with the coating layer had a larger discharge reserve than that of Comparative Sample A. This means that a reduction in the discharge reserve was small, that is, the amount of hydrogen that permeates through the battery case to the outside was small. Thus, hydrogen was suppressed from permeating through the battery case by using the battery case in which the coating layer made of a resin having a small hydrogen permeability coefficient was formed. Furthermore, the permeation of hydrogen was suppressed further by applying and drying the resin solution so as to form the coating layer, and then performing a heat treatment at a temperature of 130 to 160° C. so as to increase the crystallinity of the resin constituting the coating layer.

Example 2

In Example 2, a nickel-metal hydride battery was produced as an example of the alkaline storage batteries of Embodiments 1 and 2.

First, multilayered films were formed. A multilayered film of sample 4 has a layer structure of polypropylene (PP)/ ethylene-vinyl alcohol copolymer (EvOH)/polyethylene (PE). A multilayered film of sample 5 has a layer structure of polypropylene (PP)/Al foil/nylon. As described in Example 1, EvOH is a resin having a small hydrogen permeability coefficient. These multilayered films were formed by roll molding or injection molding.

Then, the battery case body was produced by insert molding. First, the multilayered film as described above was disposed in a mold of the battery case body. Then a PP-PPE polymer alloy that is the material of the resin case was injected into the mold, so that the battery case body provided with the resin case and the multilayered film integrated with the outer surface of the resin case was produced.

A nickel-metal hydride battery was produced in the same manner as in Example 1 except that the thus produced battery case body was used. As Comparative Sample B, a nickel-metal hydride battery was produced with a battery case body that was not provided with the multilayered film. Then, discharge, storage and measurement of the discharge reserve with respect to the produced nickel-metal hydride batteries were performed in the same manner as in Example 1. Table 2 shows the measurement results and the thickness of each layer of the multilayered film. In Table 2, the first layer is the layer attached to the resin case and the third layer is the surface layer.

TABLE 2

| Sample No. | material of multilayered film first layer/second layer/third layer | thickness of each layer [μm] | discharge reserve [Ah] |
|---|---|---|---|
| Comparative Sample B | No multilayered film | — | 2.0 |
| Sample 4 | PP/EvOH/PE | 70/20/30 | 2.7 |
| Sample 5 | PP/Al foil/nylon | 20/50/20 | 3.7 |

As shown in Table 2, Sample 4, which is an alkaline storage battery of Embodiment 1, and Sample 5, which is an alkaline storage battery of Embodiment 2, had a larger discharge reserve of Comparative Sample B. Thus, according to the alkaline storage batteries of the present invention, hydrogen is suppressed from permeating through the battery case to the outside.

When Samples 1 and 3 of Example 1 were stored in an atmosphere at a temperature of 65° C. under high humidity (humidity: 80%) for one month and then the discharge reserve was measured, the discharge reserve was 2.3 Ah to 2.4 Ah. On the other hand, Sample 4 of Example 2 was tested under the same conditions, the discharge reserve was unchanged from the case of a test under ordinary humidity. Therefore, it is preferable that the uppermost surface layer of a battery that is expected to be used in a high humidity environment is formed of a resin having a high water resistance.

In Examples 1 and 2, the cases in which a resin having a small hydrogen permeability coefficient (the hydrogen permeability coefficient is $1\times10^{-17}$ mol·m/m$^2$·sec·Pa or less) was used were described. However, with a resin having a hydrogen permeability coefficient of $1\times10^{-15}$ mol·m/m$^2$·sec·Pa, a sufficient effect can be obtained if the thickness of the coating layer is about 100 μm (hydrogen permeability: $1\times10^{-11}$ mol/m$^2$·sec·Pa).

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for producing an enclosed nickel-metal hydride storage battery including a battery case and a group of electrodes arranged in the battery case, the battery case including a resin case on the outer surface of which a multilayered film is formed, comprising:
   integrating the multilayered film with the resin case by insert molding after the multilayered film is formed by roll molding or injection molding,
   wherein the multilayered film includes an inner resin layer, a metal layer, and a surface resin layer in the indicated order from the resin case side,
   the inner resin layer contains the same resin as a resin constituting the resin case,
   the resin case has a wall thickness of 1 mm to 3 mm,
   the inner resin layer has a thickness of 20 μm to 70 μm,
   the metal layer has a thickness of 5 μm to 100 μm, and
   the surface resin layer has a thickness of 20 μm to 70 μm.

2. The method for producing the enclosed nickel-metal hydride storage battery according to claim 1, wherein
   the multilayered film further comprises a resin layer disposed between the metal layer and the resin case.

3. The method for producing the enclosed nickel-metal hydride storage battery according to claim 1, wherein
   the resin case is made of a polymer alloy of polypropylene and polyphenylene ether.

4. The method for producing the enclosed nickel-metal hydride storage battery according to claim 1, wherein
   the metal layer is made of aluminum.

* * * * *